(12) United States Patent
Nakamura et al.

(10) Patent No.: US 7,141,737 B2
(45) Date of Patent: Nov. 28, 2006

(54) CONNECTOR AND A METHOD ASSEMBLING IT

(75) Inventors: Hideto Nakamura, Yokkaichi (JP); Kazuhiko Nimura, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 11/222,995

(22) Filed: Sep. 9, 2005

(65) Prior Publication Data
US 2006/0054342 A1  Mar. 16, 2006

(30) Foreign Application Priority Data
Sep. 10, 2004  (JP)  ............... 2004-264407

(51) Int. Cl.
*H02G 3/04* (2006.01)
(52) U.S. Cl. .................... 174/72 A; 123/456
(58) Field of Classification Search .......... 174/48, 174/68.1, 68.3, 72 A, 95, 96, 97, 99 R; 123/456, 123/470; 248/68.1, 73
See application file for complete search history.

(56) References Cited

U.S. PATENT DOCUMENTS

| | | | | |
|---|---|---|---|---|
| 5,597,980 A | * | 1/1997 | Weber | ............ 174/72 A |
| 6,240,903 B1 | * | 6/2001 | Kurozumi | ............ 174/72 A |
| 6,405,713 B1 | * | 6/2002 | Scollard et al. | ............ 123/468 |
| 6,584,949 B1 | * | 7/2003 | Franchi et al. | ............ 174/72 A |
| 6,725,839 B1 | * | 4/2004 | Zdroik et al. | ............ 123/456 |
| 6,903,275 B1 | * | 6/2005 | Jetton | ............ 174/72 A |
| 6,959,695 B1 | * | 11/2005 | Warner et al. | ............ 123/456 |

FOREIGN PATENT DOCUMENTS

JP   2003-230222   8/2003

* cited by examiner

*Primary Examiner*—Dean A. Reichard
*Assistant Examiner*—Adolfo Nino
(74) *Attorney, Agent, or Firm*—Gerald E. Hespos; Anthony J. Casella

(57) ABSTRACT

A fixing member (30) is formed by coupling a plurality of mounting portions (31A, 31B) spaced apart along the longitudinal direction of a protector main body (10) by a coupling portion (32). Thus, one fixing member (30) is sufficient for one protector main body (10), thereby reducing the number of parts. The protector main body (10) and the fixing member (30) are so locked as to have their relative displacements prevented only at one position along the longitudinal direction of the protector main body (10) and are permitted to make relative displacements along the longitudinal direction of the protector main body (10) in other areas. Thus, areas of the protector main body (10) excluding the one locked position with the fixing member (30) can independently undergo a deformation caused by heat shrinkage without being influenced by the corresponding deformation of the fixing member (30) as temperature changes.

11 Claims, 19 Drawing Sheets

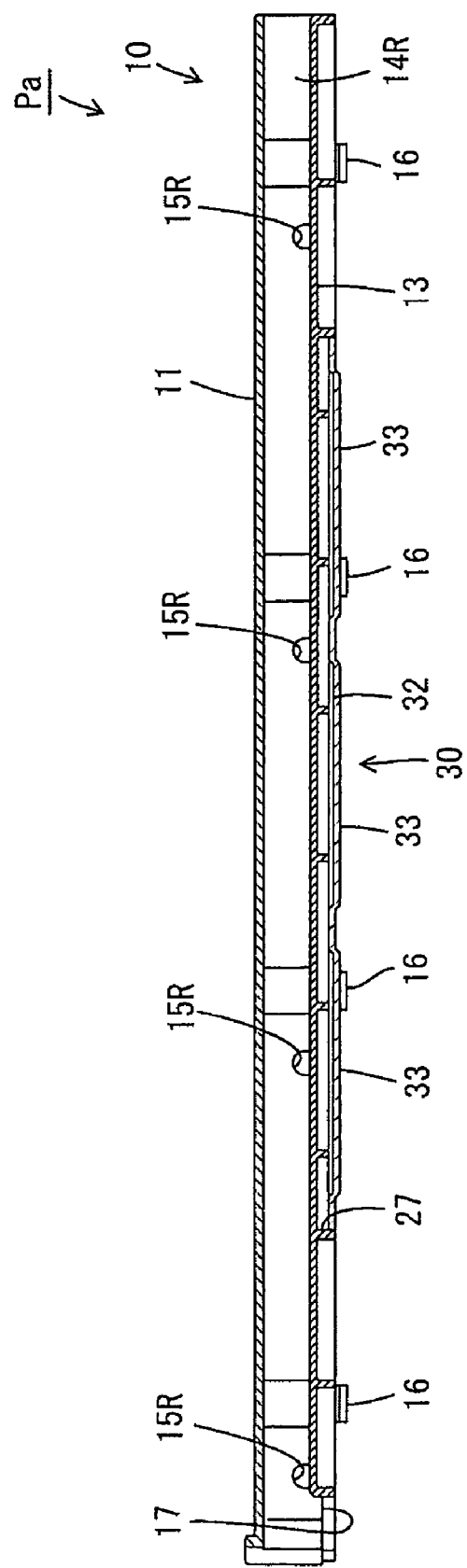

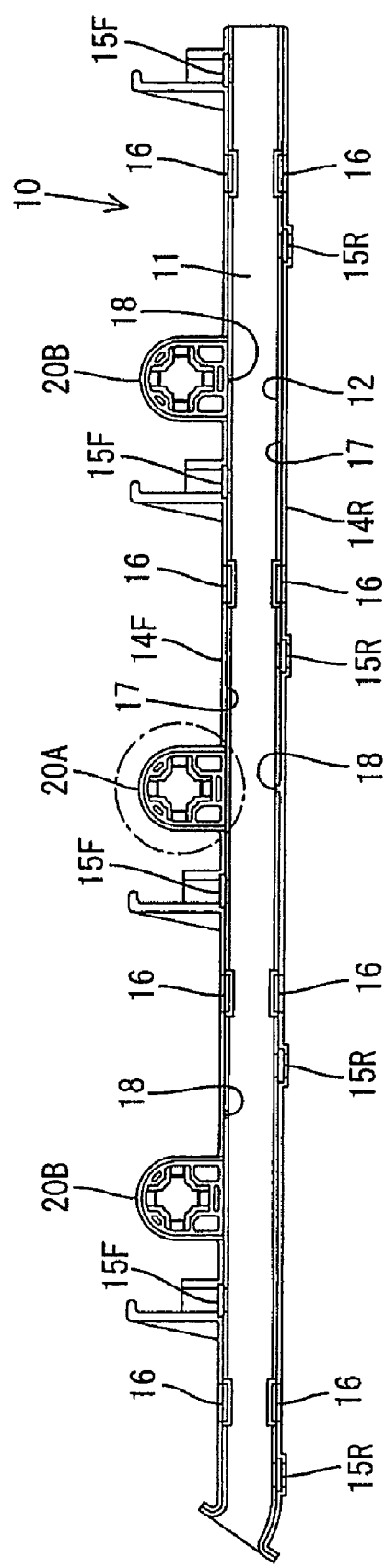

CONNECTOR AND A METHOD ASSEMBLING IT

BACKGROUND OF THE INVENTION

1. Field of the Invention

The invention relates to a harness protector to be mounted on a device and to a method of assembling it.

2. Description of the Related Art

A harness is used for supplying power to an injector of an automotive vehicle. The harness is accommodated in a long narrow tubular protector for protecting the harness. The protector is fixed to a casing of the injector by screws or the like at a plurality of positions spaced apart along the longitudinal direction of the protector. One such protector is shown in Japanese Unexamined Patent Publication No. 2003-230222.

The protector and the injector are arranged in an engine compartment and are exposed to large temperature variations. The casing of the injector is made of a metal. However, the protector is made of a synthetic resin for weight saving. Thus, thermal expansion rates of the protector and the casing are different. A protector that is fixed directly to the injector casing at a plurality of positions can damage the injector as the temperature changes. Some protectors employ separate fixing members that are relatively displaceable along the longitudinal direction of the protector in an effort to avoid damage attributable to differential thermal expansion of the protector and the injector casing.

The use of several fixing members for each protector complicates assembly and creates inventory control problems.

The present invention was developed in view of the above problems and an object thereof is to reduce the number of parts.

SUMMARY OF THE INVENTION

The invention relates to a harness protector with a main body for accommodating a harness. The harness protector also includes a fixing member. Mounting portions are spaced apart along the longitudinal direction of the main body and are coupled by a coupling. The main body and the fixing member are locked to have relative displacements prevented only at one position along the longitudinal direction of the main body, but are permitted to make relative displacements along the longitudinal direction of the main body in other areas. The main body is attached to a device by fixing the mounting portions to the device.

An interval between the mounting portions fixed to the device changes as temperature changes. Areas of the main body spaced from the one locked position with the fixing member can independently undergo a deformation caused by heat shrinkage without being influenced by the corresponding deformation of the fixing member. Thus, the main body will not be damaged by differences in the heat expansion rate between the main body, the fixing member and the device. The fixing member is formed by coupling the mounting portions by the coupling portion. Thus, one fixing member preferably is sufficient for one main body and the number of parts can be reduced.

The main body preferably is made of a synthetic resin and the fixing member preferably made of a metal or an alloy.

The main body preferably has a casing with a substantially U-shaped or laterally open cross section. The fixing member closes an opening of the casing to form a substantially tubular body for covering the harness. Thus, the harness can be accommodated in the main body more easily than introducing the harness into an initially tubular main body. The fixing member is used to close the opening. Thus, a dedicated cover separate from the fixing member is not needed and the number of parts can be reduced even further.

The cover for closing the opening in the casing preferably is substantially plate-shaped. Additionally, the fixing member preferably is placed on or outwardly of an outer surface of the cover. The plate-shaped cover is prone to warping and deformation due to heat shrinkage. However, the fixing member will prevent or limit warping of the cover.

The mounting portions preferably are plates that receive screws to be engaged with the device.

The main body preferably has one or more holding portions that fit into the mounting portions and surround parts of the fixing means, such as the heads of the screws. Thus, the holding portions prevent detachment of the screws when the main body and the fixing member assembled. Accordingly, an integral protector is provided. Some constructions for holding the heads of screws are complicated and costly. However, the holding portions for surrounding the screws are simple and inexpensive parts of the main body.

The fixing means may be displaceable from a standby position where it does not project outside the harness protector and an engaging position where it can engage the device. More particularly, each screw held by the corresponding holding portion preferably is displaceable between a standby position where an externally threaded portion is accommodated in the holding portion and an engaged position where the externally threaded portion projects out from the mounting portion. Each holding portion preferably is formed with at least one resilient lock for permitting displacements of the screw between the standby position and the engaged position. The lock engages the screw and deforms resiliently to selectively lock the screw at either one of the standby position and the engaged position.

The screws are at the standby positions and do not project from the mounting portions when not screwed into the device. Thus, the externally threaded portions of the screws will not damage other members. The screws are displaced to the engaged position upon being threaded into the device.

The mounting portion and the holding portion also prevent relative displacements of the protector main body and the fixing member. This construction is simpler than a case where the main body and the fixing member require separate dedicated relative displacement preventing means.

If the main body and the fixing member were locked to have their relative displacements prevented at one longitudinal end of the main body, then a maximum relative displacement of the main body and the fixing member at the opposite end becomes larger and the main body is abraded significantly to a large extent. Accordingly, the main body and the fixing member of the subject invention preferably are locked at the longitudinal intermediate position of the main body. Thus, the maximum relative displacement of the main body and the fixing member is less and abrasion of the main body is less.

The main body preferably is fixed so that the cover does not face an outer surface of the device. Thus, the harness can be inserted and withdrawn by detaching the cover from the casing and efficiency during maintenance or the like is good.

These and other objects, features and advantages of the present invention will become more apparent upon reading of the following detailed description of preferred embodiments and accompanying drawings. It should be understood that even though embodiments are separately described, single features thereof may be combined to additional embodiments.

BRIEF DESCRIPTION OF THE DRAWINGS

FIG. 5 is a section along 5—5 of FIG. 2.

FIG. 7 is a bottom view of a casing.

DETAILED DESCRIPTION OF THE PREFERRED EMBODIMENTS

Figure 1:
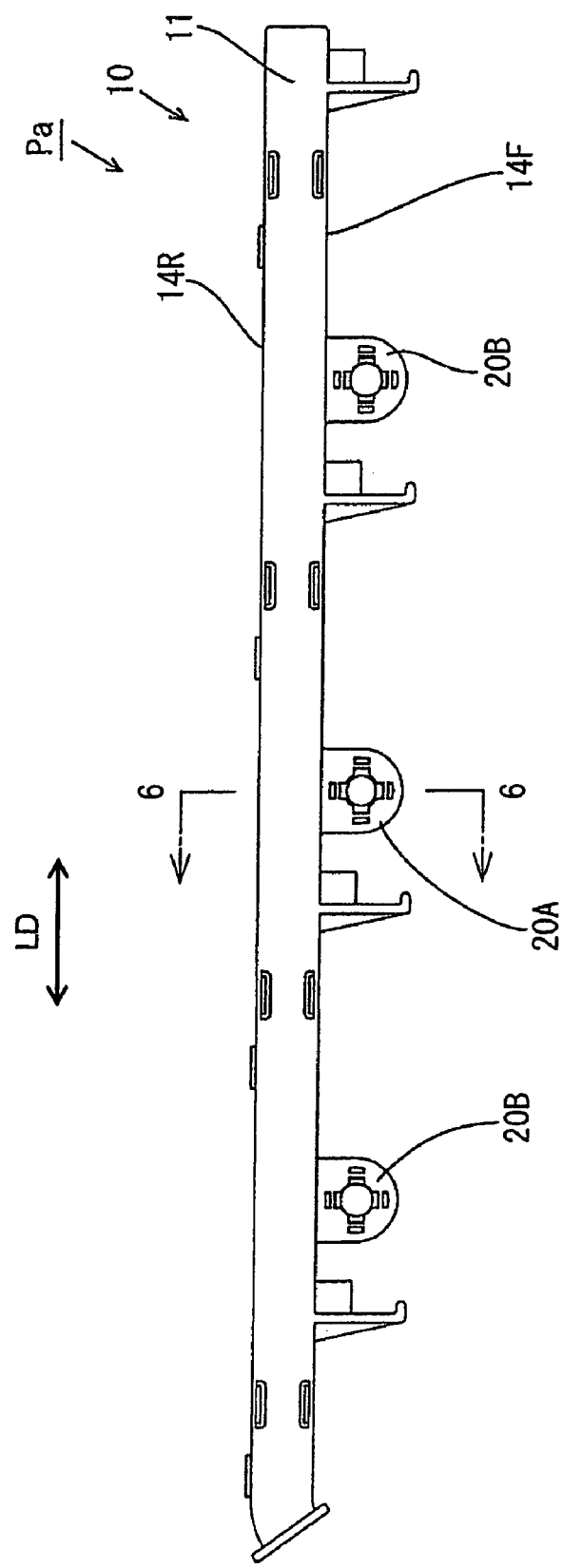
FIG. 1 is a top plan view of a harness protector according to a first embodiment.
Figure 2:
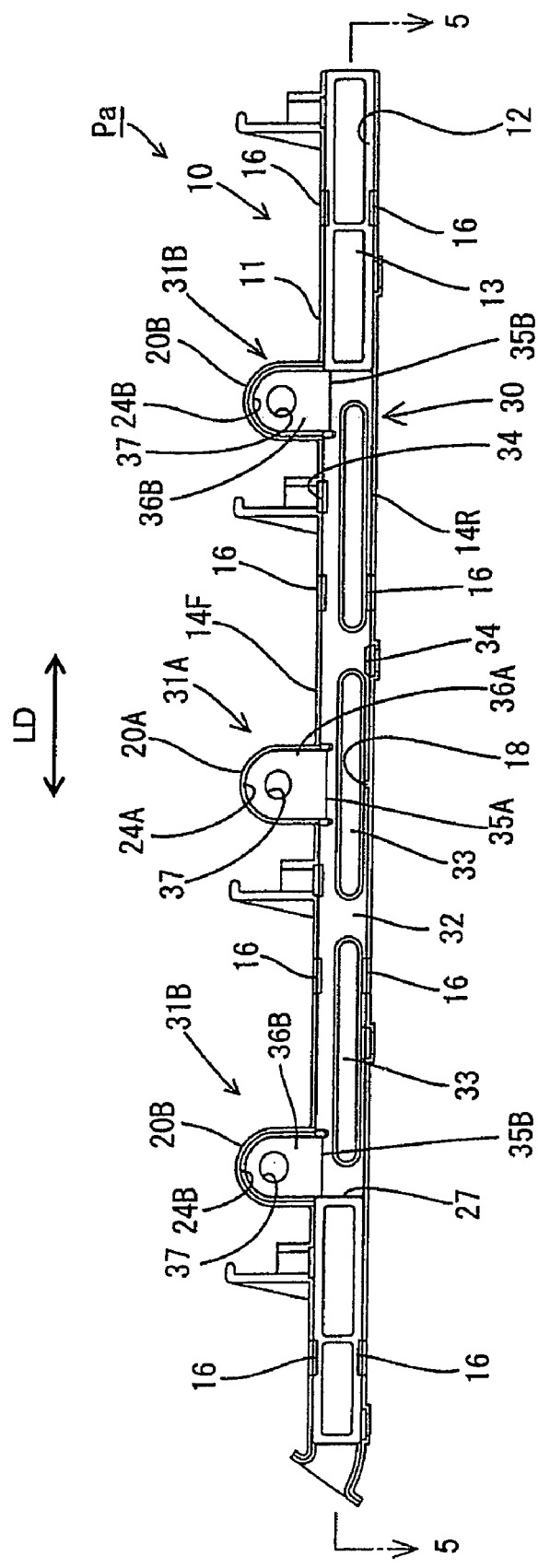
FIG. 2 is a bottom view of the harness protector of the first embodiment.
Figure 3:
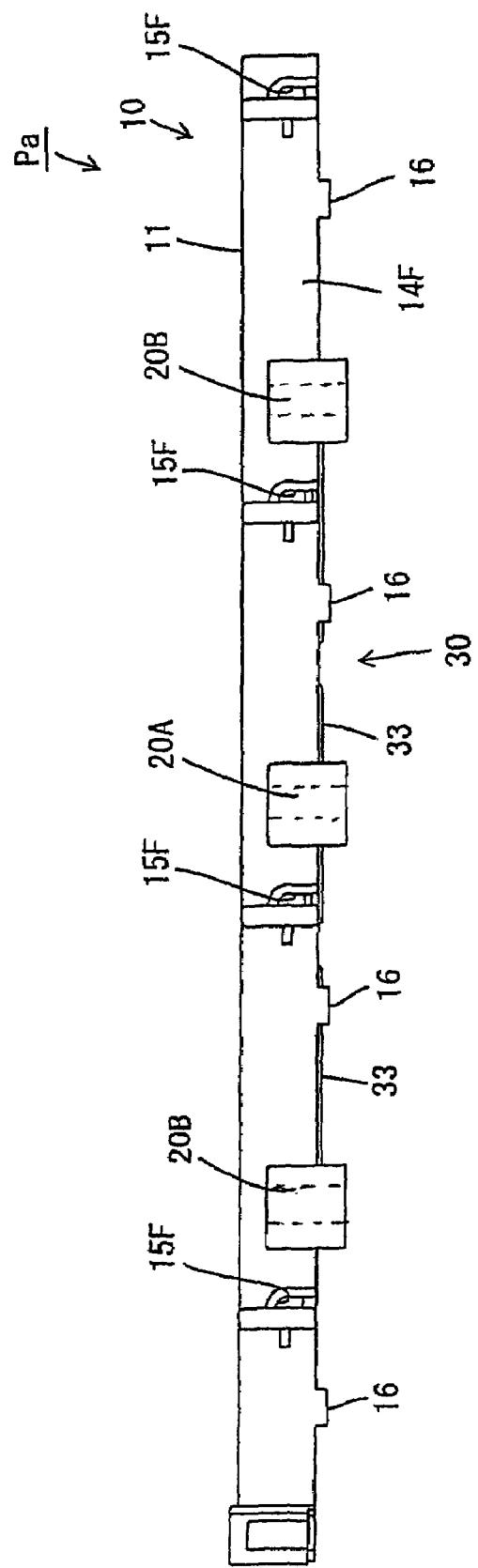
FIG. 3 is a front view of the harness protector of the first embodiment.
Figure 4:
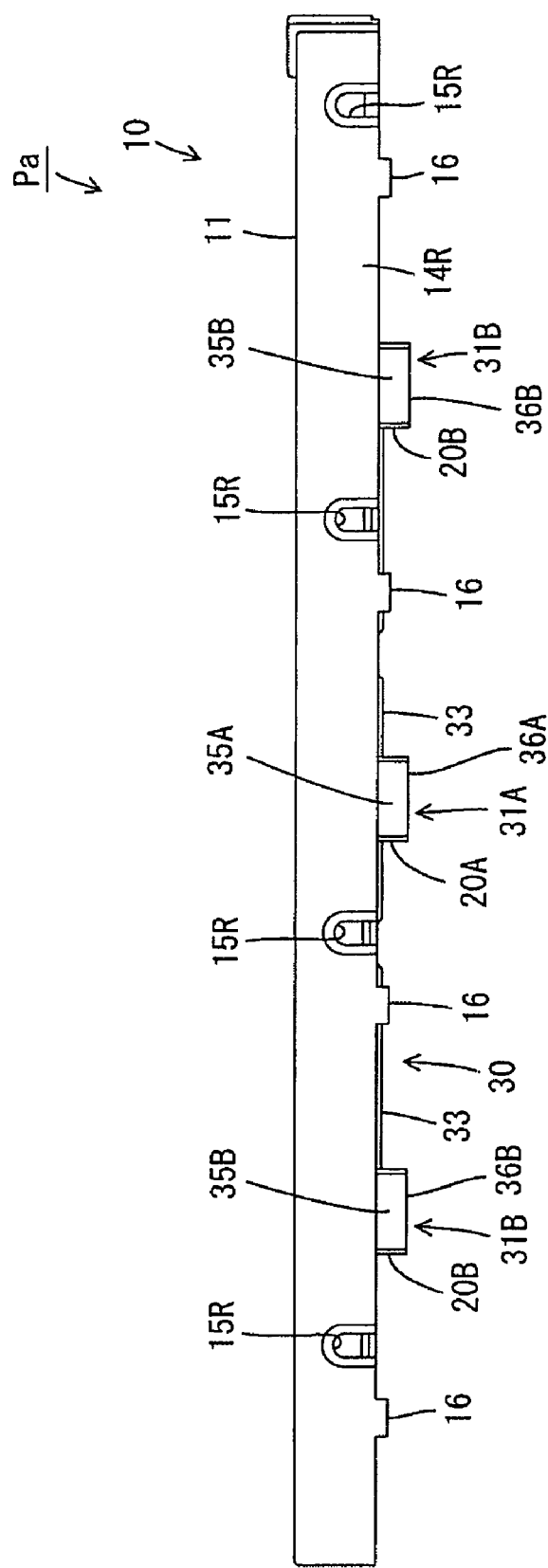
FIG. 4 is rear view of the harness protector of the first embodiment.

A harness protector according to a first embodiment of the invention is identified by the symbol Pa in FIGS. 1 to 13. The harness protector Pa of this embodiment has a long narrow rectangular tubular main body 10 with open longitudinal ends. The main body 10 is made of a moldable material, such as a synthetic resin, and is configured for mounting on an arranging surface of a device M. The main body 10 has a long narrow casing 11 of substantially U-shaped cross-section. The U-shape of the casing 11 is oriented to define an opening 12 in a lateral surface that will face the arranging surface of the device M. The main body 10 also has a long narrow plate-shaped cover 13 for closing the opening 12 of the casing 11. The casing 11 has a front wall 14F with wire draw-out portions 15F formed by making upward substantially circumferentially oriented cuts from the edge of the opening 12 at four positions spaced apart along the longitudinal direction LD of the main body 10. Similar wire draw-out portions 15R are formed in a rear wall 14R. Locking claws 16 are formed at each of the front and rear walls 14F, 14R of the casing 11 and project down from the edge of the opening 12 at four positions spaced part along the longitudinal direction LD. The locking claws 16 of the front wall 14F are arranged to define pairs with the locking claws 16 of the rear wall 14R.

Receiving recesses 17 are formed in inner surfaces of the ends of the front and rear walls 14F, 14R of the casing 11 and extend over substantially the entire length of the front and rear walls 14F, 14R. Positioning projections 18 are formed in the receiving portion 17 of the front wall 14F at positions spaced apart along the longitudinal direction LD and a positioning projection 18 is formed in the receiving portion 17 of the rear wall 14R at a longitudinal position between the positioning projections 18 of the front wall 14F.

A middle holding portion 20A projects out unitarily from the front wall 14F of the casing 11 at a position substantially in the longitudinal middle of the casing 11. Two end holding portions 20B project out unitarily from the front wall 14F of the casing 11 at positions between the middle holding portion 20A and the opposite ends of the casing 11. The end holding portions 20B are substantially equidistant from middle holding portion 20A and from the opposite ends of the casing 11. The upper surfaces of the holding portions 20A, 20B are lower than the upper surface of the casing 11, and the lower surfaces of the holding portions 20A, 20B are below the bottom surface of the casing 11. The holding portions 20A, 20B are in the form of tubes having open upper and lower surfaces, and fixing means, such as screws V, can be accommodated inside the holding portions 20A, 20B. Four resilient locking pieces 21 extend unitarily along the inner wall of each holding portion 20A, 20B and are spaced apart circumferentially at substantially equal intervals of about 90°. The resilient locking pieces 21 are narrow and long along a vertical direction VD that is substantially normal to the longitudinal direction LD. Upper and lower ends of the resilient locking pieces 21 are supported on the inner walls of the holding portions 20A, 20B so that the locking pieces 21 are resiliently deformable in directions substantially normal to the vertical direction VD. A locking projection 22 projects in from a substantially vertical middle position of each resilient locking piece 21. Four circumferentially spaced retainers 23 project in from the upper opening edge of each holding portion 20A, 20B, and fitting portions 24A, 24B are formed by recessing the inner circumferential surface of the bottom opening edge of the holding portions 20A, 20B.

The cover 13 is a long narrow plate configured to close the opening 12 over substantially the entire length of the casing 11. Positioning grooves 26 are formed at front and rear edges of the cover 13 at positions corresponding to the positioning projections 18 of the casing 11. A shallow recess 27 is formed in the lower surface of the cover 13 for receiving a coupling 32 of the fixing member 30. The recess 27 is slightly longer than the coupling 32.

The fixing member 30 is formed by bending a metal or alloy plate so that three mounting portions 31A, 31B are coupled to each other by one coupling 32. The coupling 32 is a long narrow plate formed with outwardly projecting reinforcing embossments 33. The coupling 32 has a length corresponding to the holding portions 20A, 20B and the wire draw-out portions 15F, 15R. Thus, the coupling 32 is shorter than the cover 13 and does not reach the opposite ends of the cover 13. The coupling 32 overlaps the cover 13 in the width direction over substantially the entire length of the coupling 32. Escaping portions 34 corresponding to the wire draw-out portions 15F, 15R of the casing 11 are formed in each of the front and rear edges of the coupling 32.

The mounting portions 31A, 31B are bent into substantially L-shapes when viewed sideways and are coupled to the front edge of the coupling 32. Each mounting portion 31A, 31B has a substantially plate-shaped leg 35A, 35B extending down from the front edge of the coupling 32 and a substantially plate-shaped fixing portion 36A, 36B extending forward at substantially 90° from the bottom edge of the leg 35A, 35B. Thus, each mounting portion 31A, 31B is lowered with respect to the coupling 32 to form a step. The fixing portions 36A, 36B have substantially the same plan view as the fixing portions 24A, 24B of the holding portions 20A, 20B. Mount holes 37 penetrate the fixing portions 36A, 36B vertically and are substantially concentric with the holding portions 20A, 20B. The diameter of the mount holes 37 is smaller than the diameters of heads Va of the screws V and larger than the diameters of externally threaded portions Vb of the screws V.

The intermediate mounting portion 31A is dimensioned to fit into the fixing portion 24A of the intermediate holding portion 20A while having relative displacements along forward and backward directions and transverse directions prevented by leaving substantially no clearance. The intermediate mounting portion 31A and the intermediate holding portion 20A are in an intermediate position of the recess 27. The two end mounting portions 31B are disposed to fit into the fixing portions 24B at the opposite ends while leaving clearances along forward and backward directions and transverse directions.

The harness protector Pa is assembled by inserting the screws V into the respective holding portions 20A, 20B from below and along a mounting direction MD. The heads Va of the screws V initially engage the locking projections 22. However, the screws V are pushed further. Thus, the heads Va of the screws V pass the locking projections 22 and the resilient locking pieces 21 deform resiliently out and away from the screws V. The heads Va and at least parts of the externally threaded portions Vb of the screws V are accommodated in the holding portion 20A, 20B at the standby positions SP. Accordingly, the outer peripheral edges of the upper ends of the heads Va contact the retaining portions 23 and the locking pieces 21 are restored resiliently so that the locking projections 22 engage the outer peripheral edges of the bottom ends of the heads Va. As a result, the heads Va are held between the retaining portions 23 and the locking projections 22. In this way, the screws V cannot displace vertically along the mounting direction MD and are surrounded by the holding portions 20A, 20B. Inner surfaces of the resilient locking pieces 21 contact the outer circumferential surfaces of the heads Va at four sides that are spaced circumferentially at the intervals of about 90°. Thus, the screws V cannot displace radially in the holding portions 20A, 20B.

The harness is accommodated through the opening 12 in the casing 11 prior to attaching the cover 13. The harness is a bundle of wires, including branch wires, and connector housings (not shown) are mounted at ends of the respective branch wires. The branch wires are fit into the wire draw-out portions 15F, 15R after the harness is accommodated in the casing 11 to draw the housings out of the casing 11. This operation preferably is performed with the casing 11 turned upside down.

The opening 12 in the bottom of the casing 11 is closed by the cover 13 over substantially the entire length. The positioning grooves 26 engage the respective positioning projections 18 as the cover 13 is assembled to position the casing 11 and the cover 13. Additionally, the front and rear edges of the cover 13 are fit into the receiving portions 17 of the casing 11. Thus, relative displacements between the cover 13 and the casing 11 along forward and backward directions and transverse direction are prevented. Further, the locking claws 16 engage the front and rear edges of the cover 13 from below at positions on the cover 13 more towards the front and rear ends of the cover 13 than the recess 27 to assemble the cover 13 with the casing 11. In this way, the harness is accommodated in the tubular body formed by the casing 11 and the cover 13.

The fixing member 30 then is assembled with the main body 10. Accordingly, the intermediate mounting portion 31A is fit into the fitting portion 24A of the intermediate holding portion 20A from below and in a fixing member mounting direction FMMD that is substantially opposite to the mounting direction MD of the screw V. Additionally, the coupling 32 is fit into the recess 27 of the cover 13. The locking claws 16 then engage the front and rear edges of the coupling 32 from below and substantially in the fixing member mounting direction FMMD to mount the fixing member 30 on the bottom surface of the main body 10. Thus, the assembled fixing member 30 and the main body 10 are locked in an intermediate position on the main body 10. The engagement of the fixing portion 36A of the intermediate mounting portion 31A and the intermediate holding portion 20A prevents longitudinal displacement therebetween. However, the coupling 32 can displace longitudinally in the recess 27 relative to the cover 13 in opposite end areas outside this locked area. Clearances are defined along forward and backward directions and transverse direction between the mounting portions 31B and the fitting portions 24B at the opposite sides, and clearances are defined along the longitudinal direction LD between the opposite ends of the coupling 32 and those of the recess 27 to permit relative displacements. Although the bottom surfaces of the holding portions 20A, 20B are closed by the fixing portions 36A, 36B of the mounting portions 31A, 31B, the externally threaded portions Vb of the screws V do not project down from the bottom surfaces of the fixing portions 36A, 36B with the screws V held at their standby positions SP. In this way, assembling of the harness protector Pa and assembling of the harness into the harness protector Pa are completed.

Figure 6A:
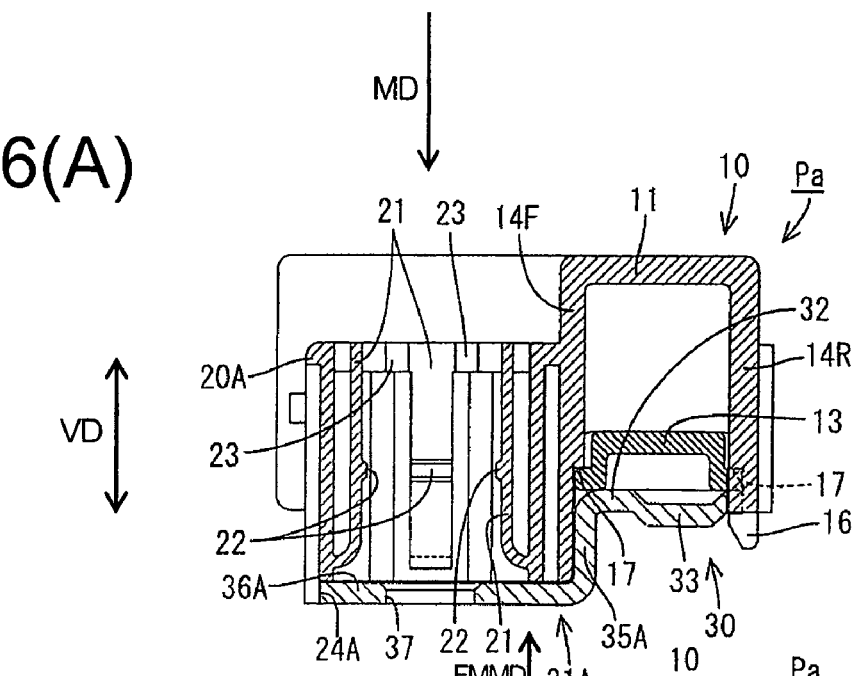
FIG. 6(a) is a section along 6—6 of FIG. 1.
Figure 6B:
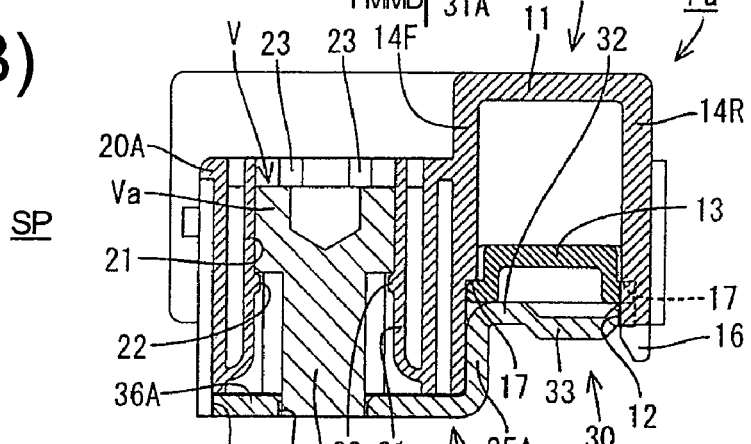
FIG. 6(b) is a similar section showing a state where a screw is held at a standby position.
Figure 6C:
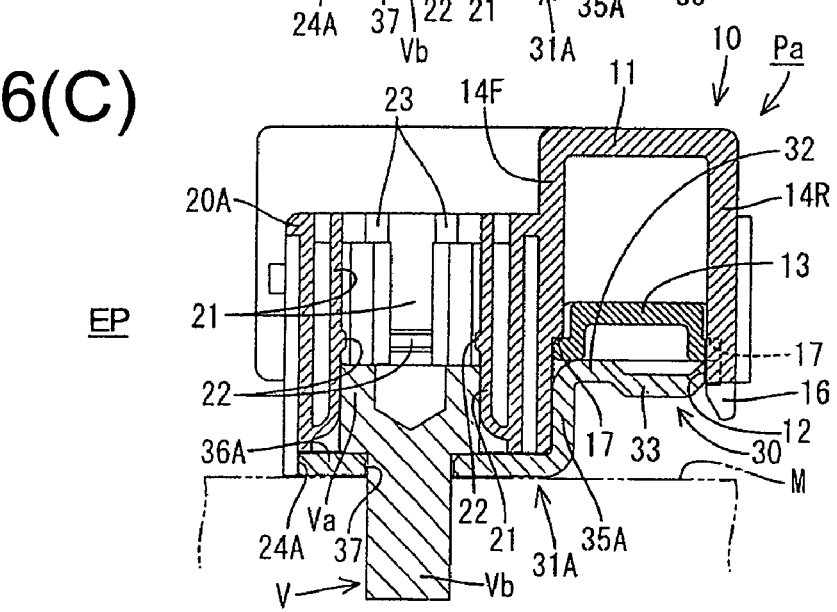
FIG. 6(c) is a similar section showing a state where the screw is held at an engaged position.
Figure 8:
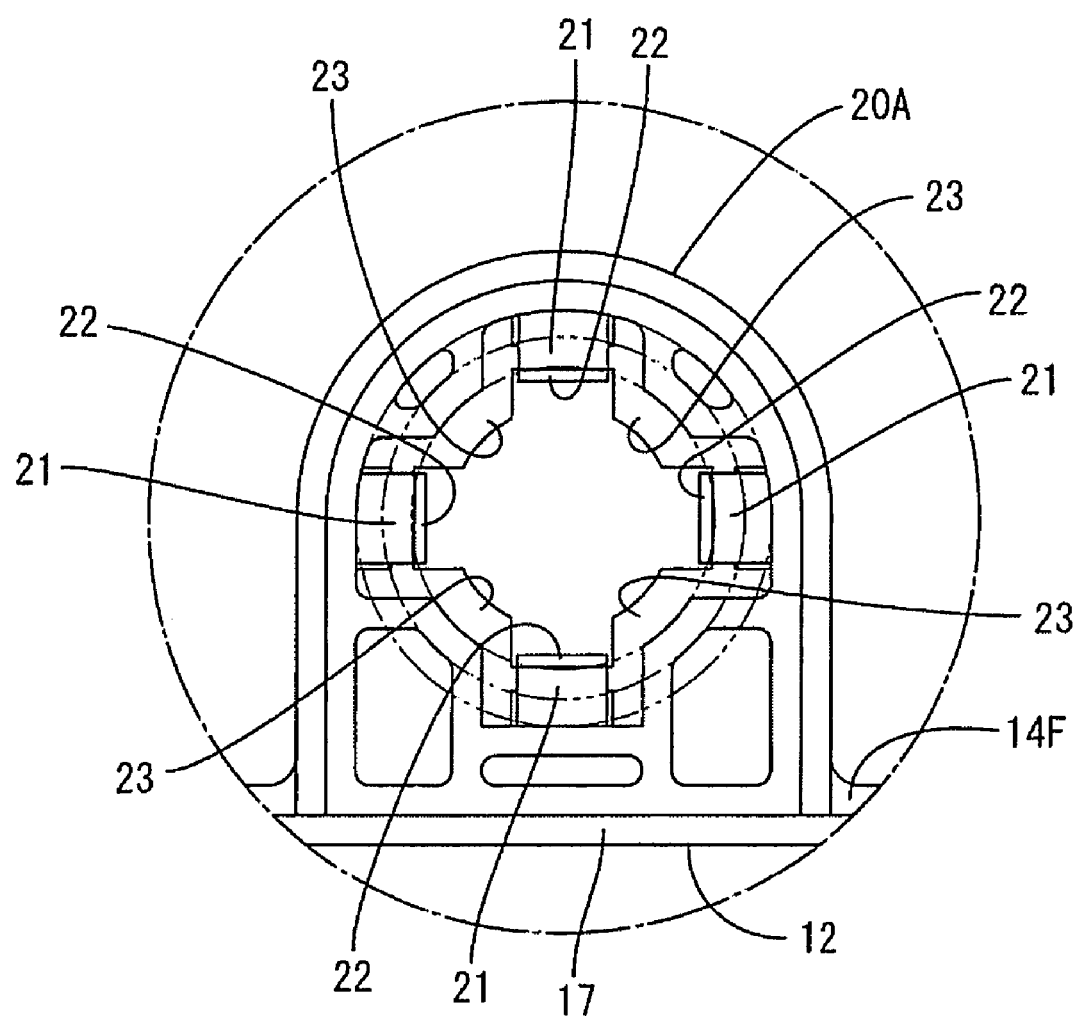
FIG. 8 is a partial enlarged view of FIG. 7.
Figure 9:
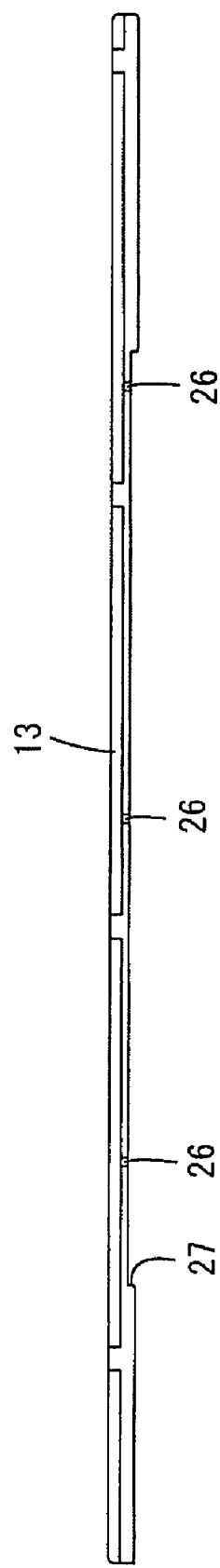
FIG. 9 is a front view of a cover.
Figure 10:
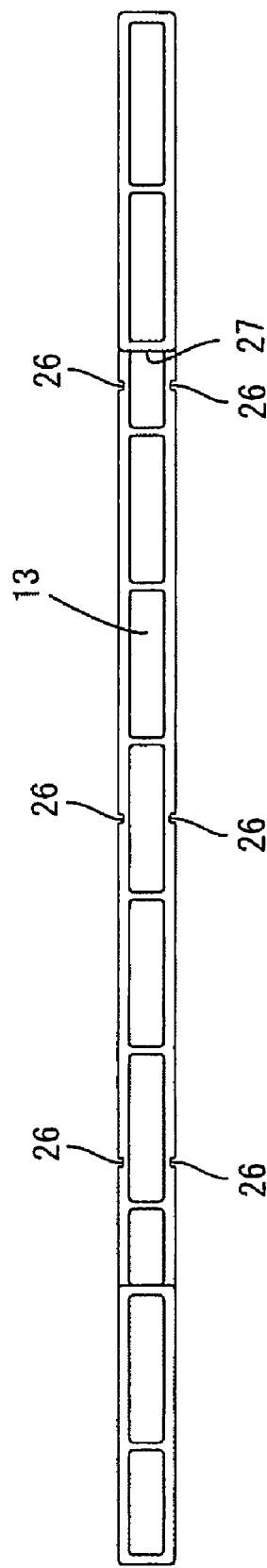
FIG. 10 is a bottom view of the cover.
Figure 11:
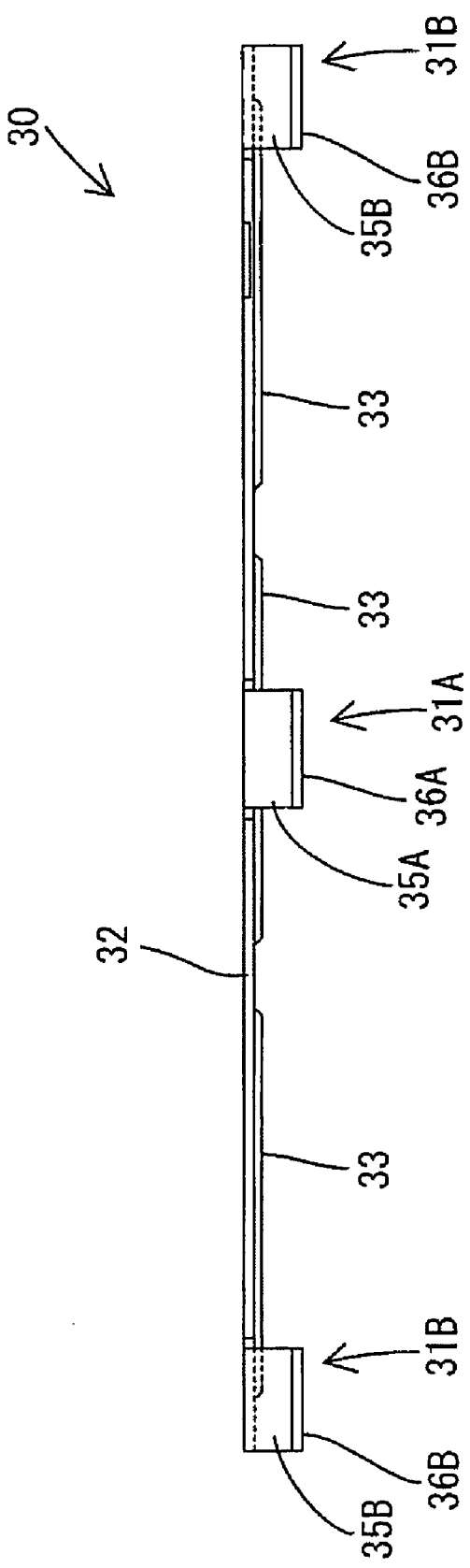
FIG. 11 is a front view of a fixing member.
Figure 12:
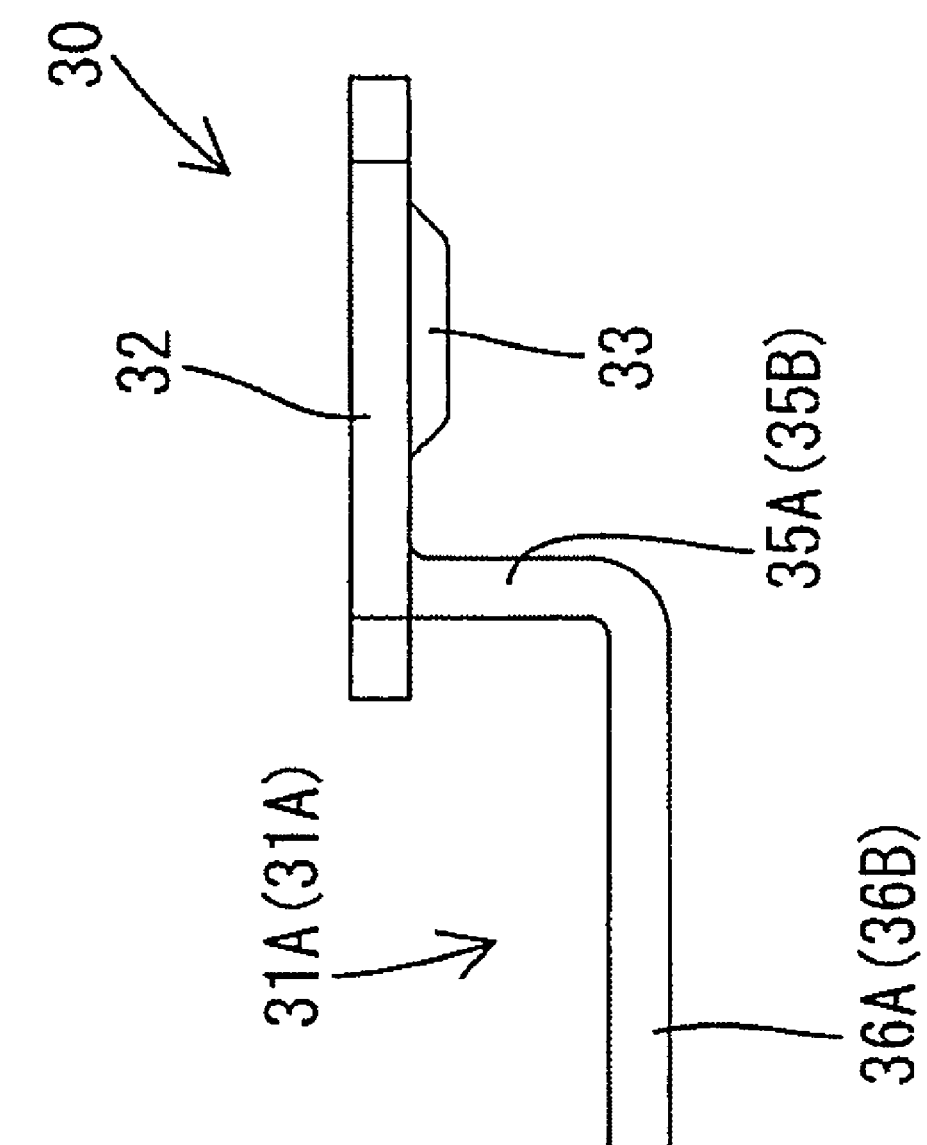
FIG. 12 is a side view of the fixing member.
Figure 13:
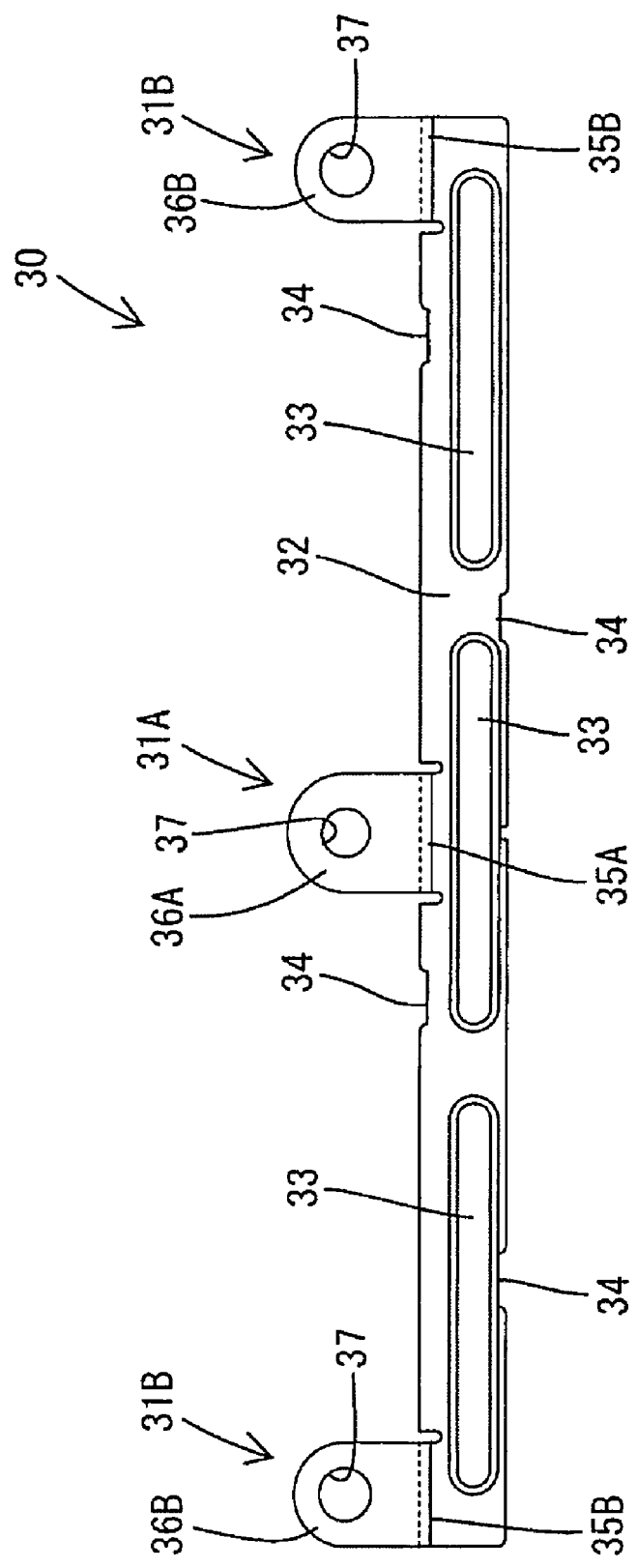
FIG. 13 is a bottom view of the fixing member.

Upon fixing this harness protector Pa to the device M, the heads Va of the screws V accommodated in the respective holding portions 20A, 20B (FIG. 6(b)) are pressed from above and along the mounting direction MD, to the standby position SP. The heads Va then pass the locking projections 22 while the resilient locking pieces 21 deform. The resilient locking pieces 21 restore resiliently when the screws V reach their engaged positions EP (FIG. 6(c)) where the outer peripheral edges of the bottom surfaces of the heads Va contact the fixing portions 36A, 36B of the mounting portions 31A, 31B. The locking projections 22 engage the outer peripheral edges of the upper surfaces of the heads Va. As a result, the heads Va are held between the fixing portions 36A, 36B and the locking projections 22, but can make slight vertical movements along the mounting direction MD. In this way, the screws V are held while being prevented from returning up towards the standby positions SP. Additionally, the externally threaded portions Vb project down from the main body 10 through the mount holes 37.

The harness protector Pa then is held in a proper posture so that the fixing member 30 is at the bottom side of the main body 10, and a jig (such as a hexagonal wrench) is engaged with the screw V through an opening in the upper surface of each holding portion 20A, 20B to turn each externally threaded portion Vb into an corresponding internally threaded hole (not shown) of the device M. Upon completing this screw-fastening operation, the harness protector Pa is fixed to the upper surface of the device M. Thus, the fixing portions 36A, 36B of the fixing member 30 are held vertically substantially along the mounting direction MD between the upper surface of the device M and the holding portions 20A, 20B. Further, the lower surface of the cover 13 and the coupling 32 placed below the lower surface are substantially opposed to and spaced apart from the upper surface of the device M.

As described above, the harness protector Pa has the metal or alloy fixing member 30 with a plurality of mounting portions 31A, 31B spaced apart along the longitudinal direction LD of the main body 10 and coupled by the coupling 32. The main body 10 and the fixing member 30 are assembled to prevent relative displacements only at one position along the longitudinal direction LD of the main body 10 and to permit relative displacements along the longitudinal direction LD in other areas.

Intervals between the mounting portions 31A, 31B fixed to the device M change as temperature changes. However, the main body 10 can independently undergo a deformation caused by heat shrinkage or dilatation without being influenced by the corresponding deformation of the fixing member 30 in all areas excluding the one locked position with the fixing member 30. Thus, there is no likelihood of breaking the main body 10 due to differences between the thermal expansion rate of the main body 10 and those of the device M and the fixing member 30. Further, since the fixing member 30 is constructed by coupling a plurality of mounting portions 31A, 31B by the coupling 32, only one single fixing member 30 is necessary for one main body 10, thereby reducing the number of parts.

The opening 12 of the U-shaped casing 11 is closed by the cover 13. Thus, the harness easily is fit into the casing 11 as compared to a construction in which a harness is introduced into a tubular main body. Additionally, the metal or alloy fixing member 30 is placed on the outer surface of the cover 13 to prevent warping.

Further, the mounting portions 31A, 31B of the fixing member 30 are plates enabling the screws V to penetrate therethrough and into the device M. The main body 10 has the holding portions 20A, 20B that fit into the mounting portions 31A, 31B to surround the heads Va of the screws V. Thus, the heads Va of the screws V are at least partly surrounded by the holding portions 20A, 20B to prevent the detachment of the screws V, and the screws V become integral to the protector Pa. Accordingly, screwing the screws V into the device M is easier.

Production costs are high if a complicated bending step is required for bending a metal plate to hold the heads Va of the screws V. However, in this embodiment, a working cost for holding the heads Va of the screws V is low since the heads Va of the screws V are at least partly surrounded by the holding portions 20A, 20B formed in the main body 10.

The screws V held in the holding portions 20A, 20B are displaceable between the standby positions SP where the externally threaded portions Vb are in the holding portions 20A, 20B and the engaged positions EP where the externally threaded portions Vb project out from the mounting portions 31A, 31B. Additionally, the holding portions 20A, 20B have the resilient locking pieces 21 to permit displacement of the screws V between the standby position SP and the engaged position EP. The locking pieces 21 resiliently deform while selectively locking the screws V at either one of the standby position SP and the engaged position EP. With this construction, the externally threaded portions Vb of the screws V do not project out of the mounting portions 31A, 31B when the screws V are at the standby position SP and not mounted on the device M. Thus, damage to other members is prevented. The screws V are displaced towards the engaging position EP only upon being screwed into the device M.

The main body 10 and the fixing member 30 are locked to have their relative displacement prevented at the fitted portion of the mounting portion 31A and the holding portion 20A. In other words, the mounting portion 31A and the holding portion 20A also serve as means for preventing the relative displacements of the main body 10 and the fixing member 30. Accordingly, the construction is simpler than a case where the main body 10 and the fixing member 30 have a dedicated relative displacement preventing means.

If the main body 10 and the fixing member 30 are locked to have their relative displacements prevented at a longitudinal end portion of the main body 10, a maximum relative displacement of the main body 10 and the fixing member 30 at the opposite end becomes larger and the main body 10 is abraded to a larger extent. Contrary to this, the main body 10 and the fixing member 30 are engaged at the substantially longitudinal middle position of the main body 10 in this embodiment. Thus, the maximum relative displacement of the main body 10 and the fixing member 30 is smaller, thereby reducing the abrasion of the main body 10.

Figure 14:
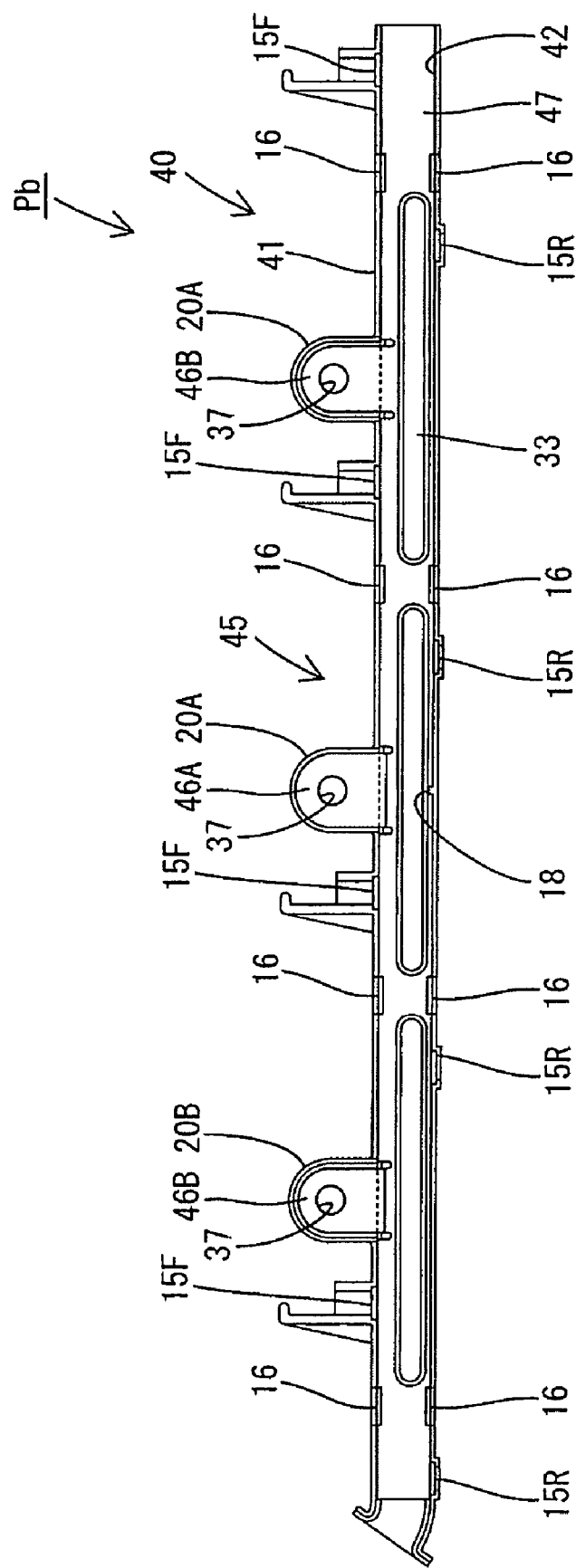
FIG. 14 is a bottom plan view of a harness protector according to a second embodiment.
Figure 15:
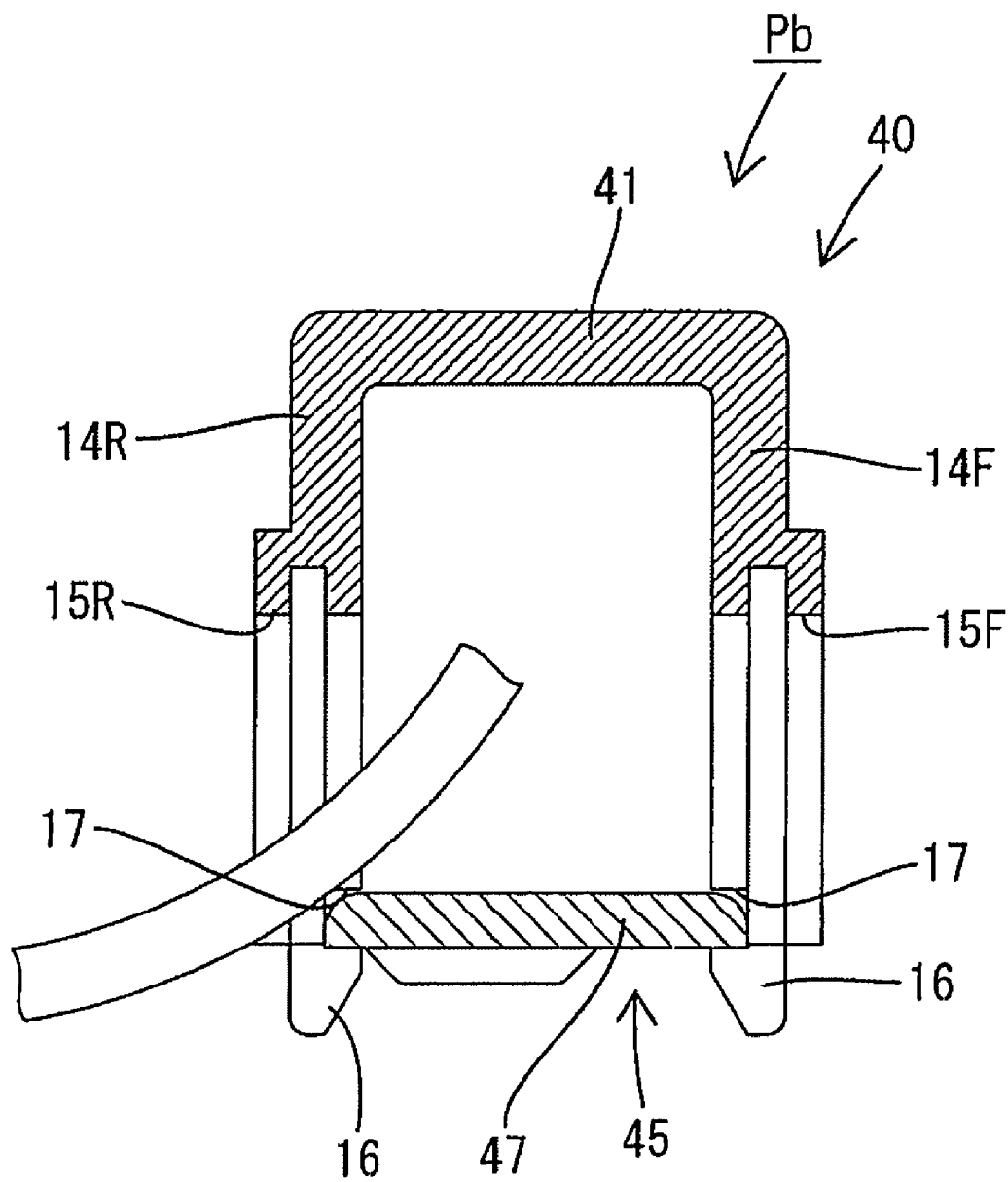
FIG. 15 is a section of the second embodiment.
Figure 16:
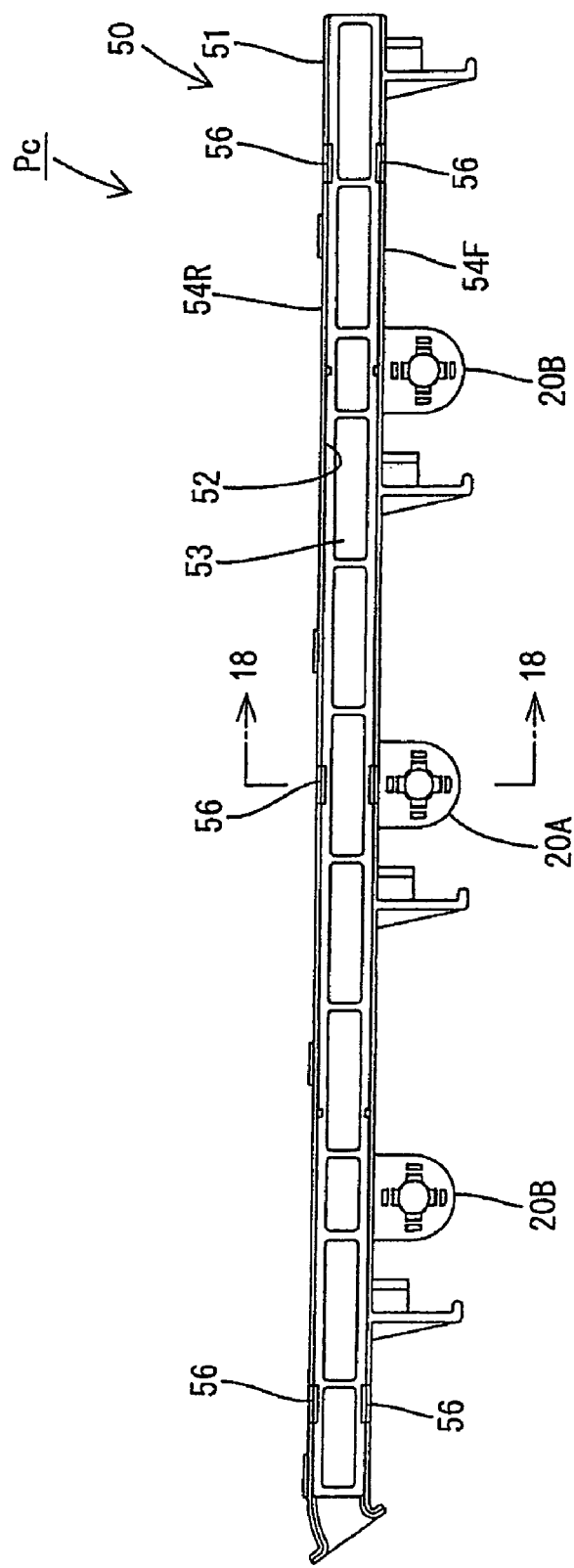
FIG. 16 is a plan view of a third embodiment.
Figure 17:
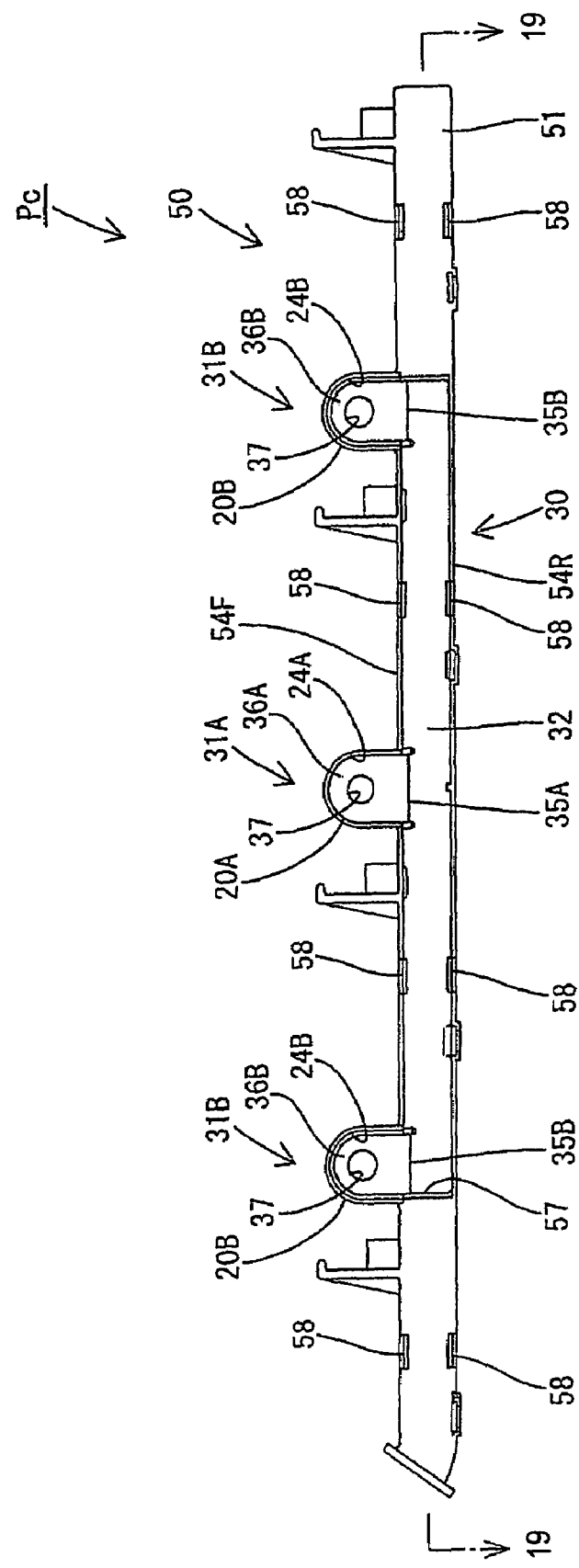
FIG. 17 is a bottom view of the third embodiment.
Figure 18:
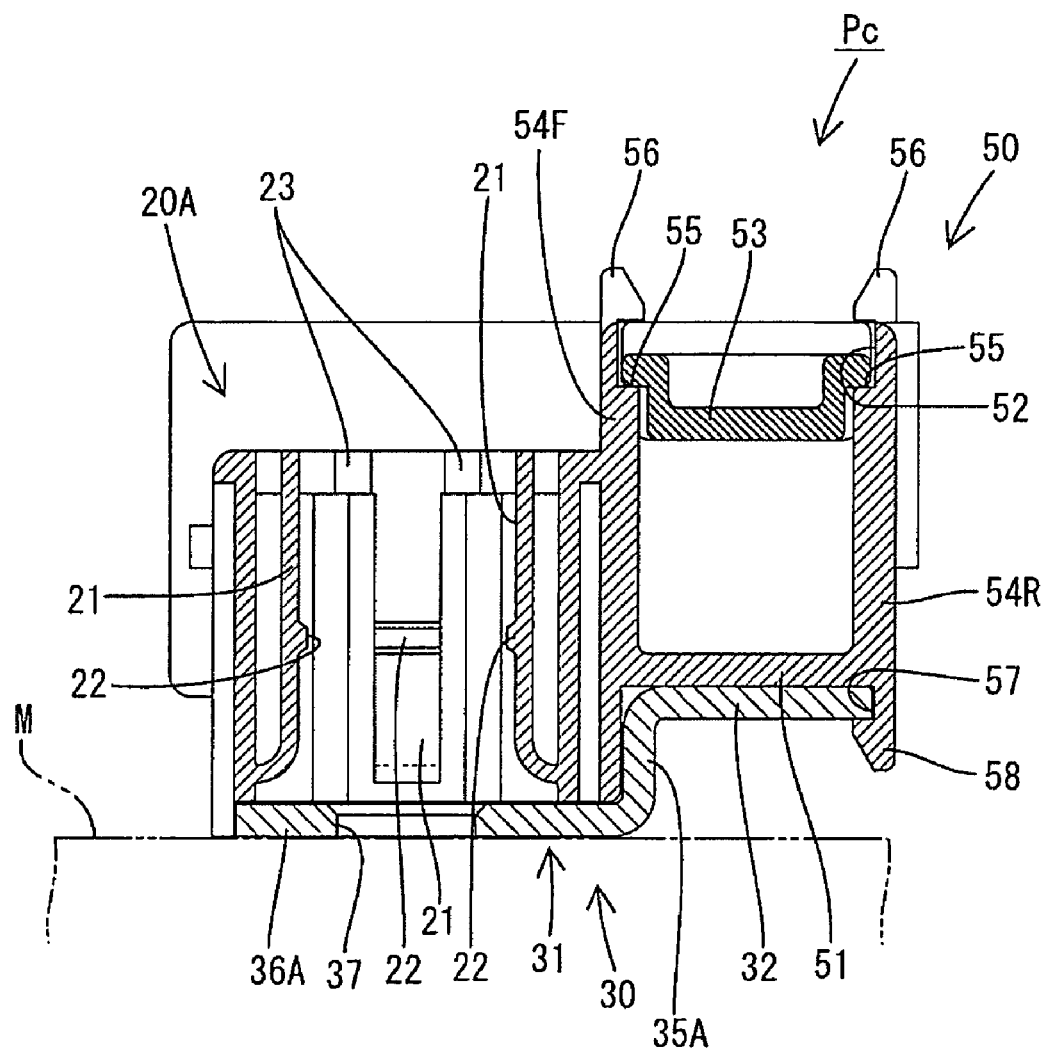
FIG. 18 is a section along 18—18 of FIG. 16.
Figure 19:
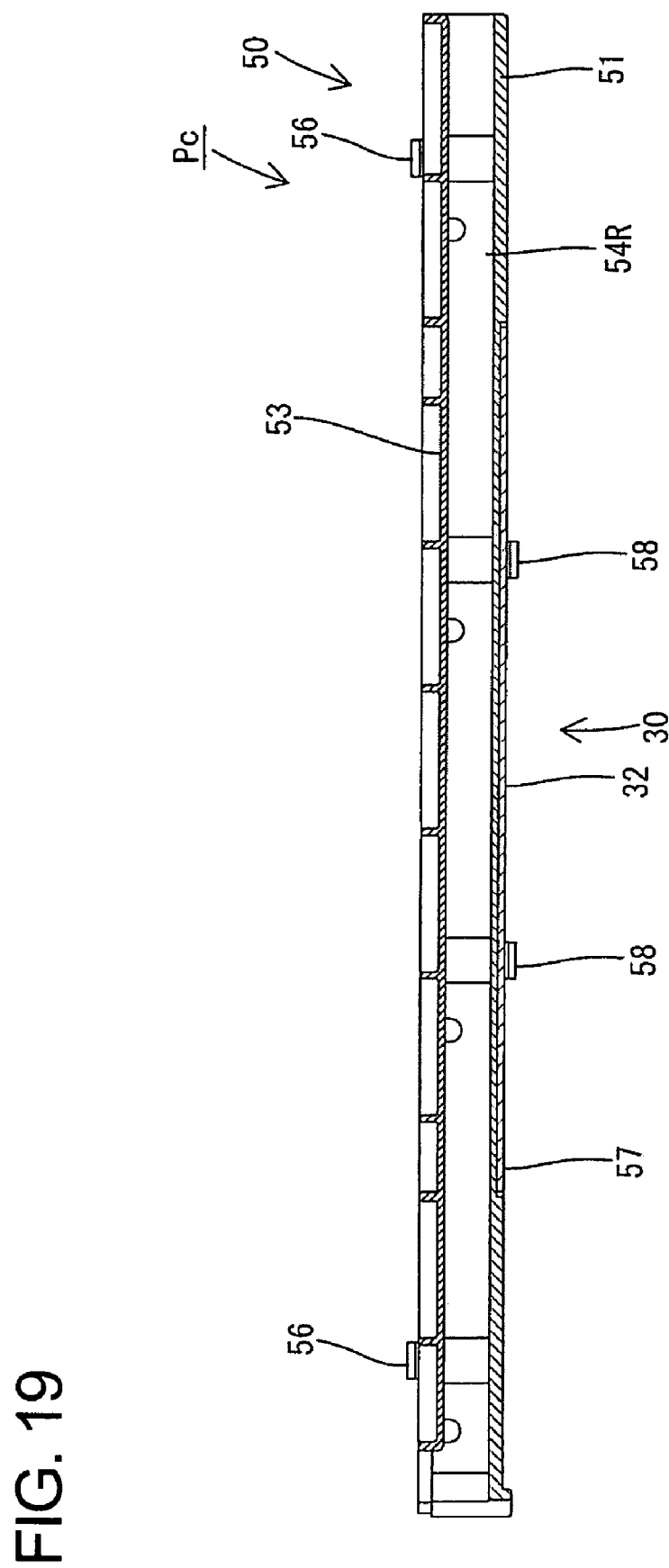
FIG. 19 is a section along 19—19 of FIG. 17.

A second embodiment of the invention is described with reference to FIGS. 14 and 15. A harness protector Pb of the second embodiment has a main body 40 with a casing 41 made of a moldable material, such as a synthetic resin. The casing 41 has a substantially U-shaped cross section opening towards one side. An opening 42 of the casing 41 is closed by a coupling 47 of a fixing member 45. Thus, a tubular body for surrounding a harness is formed by two parts, namely, the casing 41 and the fixing member 45, and there is no member corresponding to the cover 13 of the first embodiment. The coupling 47 of the fixing member 45 has a length substantially equal to the entire length of the casing 41, and the opposite front and rear edges of the coupling 47 are fit directly into receiving portions 43 of the casing 41. Further, the fixing member 45 and the casing 41 are prevented from making relative longitudinal displacements only at a fitted portion of an intermediate holding portion 20A of a the three holding portions 20A, 20B and an intermediate mounting portion 46A of the three mounting portions 46A, 46B.

The casing 41 has a substantially U-shaped cross section. Thus, the harness can be fit easily into the casing 41 as compared to a construction in which a harness is introduced into a tubular main body. Further, the fixing member 45 is used as means for closing the opening 42 of the casing 41. Hence, there is no need to use a dedicated cover separate from the fixing member 45, and the number of parts can be reduced.

Since the other construction is similar or same as in the first embodiment, it is identified by the same reference numerals and its structure, functions and effects are not described.

A third embodiment of the invention is described with reference to FIGS. 16 to 19. A main body 50 of a harness protector Pc according to the third embodiment is comprised of a casing 51 made of a moldable material, such as a synthetic resin. The casing has a substantially U-shaped cross section and is formed with an opening 52 in its upper surface. A substantially plate-shaped cover 53 made of a synthetic resin closes the opening 52 of the casing 51. Similar to the first embodiment, receiving portions 55 are formed at the front and rear edges of the opening 52 of the casing 51 by recessing the upper ends of front and rear walls 54F, 54R over the entire length. Further, similar to the first embodiment, short locking claws 56 project up at longitudinally spaced positions of each of the front and rear walls 54F, 54R of the casing 51 at the opening edge of the opening 52. The cover 53 is mounted in the opening 52 in the upper surface and is held by the locking claws 56. On the other hand, similar to the recess 27 of the first embodiment, a recess 57 is formed in the bottom surface of the casing 51 for receiving a coupling 32 of a fixing member 30. Further, locking claws 58 are formed on the bottom surface of the casing 51 and project down from the opposite front and rear edges.

The fixing member 30 is substantially identical to the fixing member 30 of the first embodiment. The fixing member 30 is assembled with the main body 50 so that the coupling 32 is below the bottom surface of the casing 51, i.e. placed below the surface facing the device M. Specifically, the coupling 32 is fit into the recess 57. Three mounting portions 31A, 31B are fit into respective fitting portions 24A, 24B at the bottom surfaces of holding portions 20A, 20B, and the locking claws 56 are engaged with the front and rear edges of the coupling 32. Thus, the fixing member 30 is held assembled with the protector main body 50.

The fixing member 30 and the main body 50 are locked to have their relative longitudinal displacements in the longitudinal intermediate position of the main body 50 by the engagement of a fixing portion 36A of the intermediate mounting portion 31A and the fitting portion 24A of the intermediate holding portion 20A. In the opposite side areas other than this locked portion, the coupling 32 is permitted to make a longitudinal displacement relative to the cover 53 in the recess 57. To permit this longitudinal displacement, clearances are defined along forward and backward directions and transverse directions between the mounting portions 31B and the fitting portions 24B at the opposite sides, and clearances are defined along the longitudinal direction LD between the opposite ends of the coupling 32 and those of the recess 57.

The main body 50 having the fixing member 30 assembled therewith is fixed to the device M so that the cover 53 does not face the outer surface of the device M, i.e. the cover 53 and the opening 52 are at the upper side by mounting the fixing member 30 on the device M by screws V in a similar manner as in the first embodiment.

Since the other construction is similar or same as in the first embodiment, it is identified by the same reference numerals and its structure, functions and effects are not described.

The main body 50 is such that the opening 52 of the casing 51 having a substantially U-shaped cross section or laterally open cross-section is closed by the cover 53. Thus, the harness is fit more easily into the casing 51 as compared to a construction in which a harness is introduced into a tubular main body. Further, the fixing member 30 is assembled with the main body 50 so that the coupling 32 is placed on a surface of the casing 51 different from the surface with the opening 52, and the main body 50 is fixed so that the cover 53 does not face the outer surface of the device M. Thus, even with the harness protector Pc fixed to the device M, the cover 53 can be detached from the casing 51 to withdraw the harness. Therefore, maintenance is easier.

The invention is not limited to the above described and illustrated embodiments. For example, the following embodiments are also embraced by the technical scope of the present invention as defined by the claims. Beside the following embodiments, various changes can be made without departing from the scope and spirit of the present invention as defined by the claims.

The fixing member is fixed by screws in the foregoing embodiments, but may be fixed by claws, clips, push-in pins or the like.

The heads of the screws are surrounded by the holding portions of the main body in the foregoing embodiments. However, they may be held by bending parts of the fixing member according to the invention.

Three mounting portions are provided in the foregoing embodiments, but other numbers may be provided according to the invention.

The fixing member and the protector are locked substantially at the longitudinal middle of the protector in the foregoing embodiments. However, the locked position of the protector and the fixing member may be another intermediate position or a longitudinal end of the protector or at a longitudinal end portion of the fixing member according to the invention.

The fixing member and the main body are locked in the foregoing embodiments using the fitting construction of the mounting portion and the holding portion. However, other means for preventing relative displacements of the fixing member and the main body may be provided.

One fixing member is assembled with one single protector in the foregoing embodiments. However, plural fixing members may be assembled with one protector according to the invention.

The protector is made of two members, i.e. the casing and the cover in the foregoing embodiments. However, the protector may have a tubular shape, and the harness may be inserted from one end of the protector.

The opening to be closed by the cover is formed in the surface facing the device in the foregoing embodiment. However, the opening may be formed in a side surface of the main body.

The coupling of the fixing member is assembled on the surface facing the device in the foregoing embodiment. However, the coupling may be so assembled on a side surface of the main body.

The mounting portions and the coupling of the fixing member are connected substantially in parallel, but at different heights to form steps in the foregoing embodiments. However, they may be connected at substantially the same height so as to be substantially flush with each other or at an angle to each other according to the invention.

The coupling of the fixing member is placed on only one of the four outer surfaces of the main body in the foregoing embodiments. However, the coupling may have a substantially L-shaped or substantially U-shaped cross section and may be placed on two or three outer surfaces of the main body.

The protector is a rectangular tube formed by the U-shaped casing and the plate-shaped cover in the foregoing embodiments. However, the protector may be a tube formed by assembling two casings of substantially U-shape or L-shape cross section so that openings thereof abut each other.

What is claimed is:

1. A harness protector, comprising:
   an elongate main body for receiving a harness, the elongate main body defining a longitudinal direction; and
   a fixing member having an elongate coupling and a plurality of mounting portions at spaced apart positions along the the coupling, the elongate coupling extending substantially along the longitudinal direction of the main body,
   wherein the main body and the fixing member are locked to have relative displacements prevented only at one position along the longitudinal direction of the main body while permitting relative displacements along the longitudinal direction of the main body in other areas, and the main body is attachable to a device by fixing the mounting portions to the device.

2. The harness protector of claim 1, wherein the main body (10; 40; 50) is made of a synthetic resin and the fixing member (30; 45) is made of a metal or an alloy.

3. The harness protector of claim 2, wherein the main body includes a casing having a substantially U-shaped cross section with a lateral opening, and the fixing member is configured for closing the lateral opening.

4. The harness protector of claim 2, wherein the main body includes a casing having a substantially U-shaped cross section defining a lateral opening, a substantially plate-shaped cover for closing the lateral opening of the casing, and the fixing member being outwardly from an outer surface of the cover.

5. The harness protector of claim 1, wherein the mounting portions are substantially in the form of plates enabling at least partial penetration of screws to be engaged with the device.

6. The harness protector of claim 5, wherein the main body is formed with holding portions provided in the mounting portions to at least partly surround heads of the screws.

7. The harness protector of claim 6, wherein the screws are mounted to the mounting portions for fixing the harness protector to the device, the screws being displaceable from a standby position where they substantially do not project outside the harness protector and an engaging position where they can engage the device.

8. The harness protector of claim 7, wherein each screw held by the corresponding holding portion is displaceable between a standby position where an externally threaded portion thereof is at least partly accommodated in the holding portion and an engaged position where the externally threaded portion projects out from the mounting portion, and each holding portion is formed with at least one resilient locking piece for permitting displacements of the screw between the standby position and the engaged position by being resiliently deformed while selectively locking the screw at either one of the standby position and the engaged position by being engaged with the screw.

9. The harness protector of claim 8, wherein the main body and the fixing member are locked to have relative displacements prevented at a fitted portion of the mounting portions and the respective holding portion.

10. The harness protector of claim 1, wherein the main body and the fixing member are locked as to have relative displacements prevented at an intermediate position along the longitudinal direction of the main body.

11. The harness protector of claim 1, wherein:

the main body includes a casing having a substantially U-shaped cross section defining a lateral opening, the main body further including a cover for at least partly closing the lateral opening of the casing, the fixing member being assembled with the main body so that the coupling is placed substantially on an outer surface of the casing different from the surface with the lateral opening, and the main body is fixed so as not to cause the cover to face an outer surface of the device.

* * * * *